United States Patent
Rajkhowa et al.

(10) Patent No.: US 10,909,495 B2
(45) Date of Patent: Feb. 2, 2021

(54) SYSTEMS AND METHODS FOR IMPLEMENTING INCENTIVE-BASED DEMAND DISTRIBUTION TECHNIQUES USING QUEUE TIME ESTIMATES

(71) Applicant: WAL-MART STORES, INC., Bentonville, AR (US)

(72) Inventors: Pratosh Deepak Rajkhowa, Bangalore (IN); Vidyanand Krishnan, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 661 days.

(21) Appl. No.: 15/642,970

(22) Filed: Jul. 6, 2017

(65) Prior Publication Data
US 2019/0012638 A1 Jan. 10, 2019

(51) Int. Cl.
*G06Q 10/08* (2012.01)
*G06Q 10/10* (2012.01)
*G06F 17/18* (2006.01)

(52) U.S. Cl.
CPC ......... *G06Q 10/0836* (2013.01); *G06F 17/18* (2013.01); *G06Q 10/1095* (2013.01)

(58) Field of Classification Search
CPC ........... G06Q 10/0836; G06Q 10/1095; G06Q 10/06315; G06Q 10/063114; G06Q 10/06312; G06Q 10/087; G06F 17/18
USPC ...................................................... 705/7.18
See application file for complete search history.

(56) References Cited

U.S. PATENT DOCUMENTS

| | | | |
|---|---|---|---|
| 5,310,997 A | 5/1994 | Roach et al. | |
| 6,010,239 A | 1/2000 | Hardgrave et al. | |
| 6,439,345 B1 | 8/2002 | Recktenwald et al. | |
| 7,974,873 B2 * | 7/2011 | Simmons | G06Q 10/06313 705/7.29 |
| 8,254,625 B2 * | 8/2012 | Coulter | G06K 9/00369 382/103 |
| 9,172,738 B1 * | 10/2015 | daCosta | H04L 67/00 |
| 2001/0042024 A1 | 11/2001 | Rogers | |
| 2003/0177141 A1 * | 9/2003 | Sahlin | G07C 11/00 |
| 2004/0068443 A1 | 4/2004 | Hopson et al. | |
| 2006/0074791 A1 * | 4/2006 | Jelaco | G06Q 10/08 705/37 |
| 2007/0187183 A1 | 8/2007 | Saigh et al. | |

(Continued)

*Primary Examiner* — Matthew S Gart
*Assistant Examiner* — Stephen S Swartz
(74) *Attorney, Agent, or Firm* — Bryan Cave Leighton Paisner LLP

(57) ABSTRACT

Systems and methods are described which utilize improved scheduling techniques. An electronic scheduling platform enables customers to view and select pick-up options for scheduling orders to be retrieved at a location. Each pick-up option is associated with a price and a queue time. An average service time and an average inter-arrival time is determined for the location. A queuing procedure is executed which calculates queue times and prices for the pick-up options based, at least in part, on the average service time and the average inter-arrival time. The queuing procedure dynamically updates in real-time the calculated queue times and prices for the pick-up options. Instructions are generated for providing an interface that displays at least a portion of the pick-up options with the updated queue times and prices.

20 Claims, 6 Drawing Sheets

(56) References Cited

U.S. PATENT DOCUMENTS

| | | | |
|---|---|---|---|
| 2008/0040172 A1* | 2/2008 | Watkins | G06Q 10/02 705/5 |
| 2009/0228325 A1* | 9/2009 | Simmons | G06Q 10/06313 705/7.23 |
| 2009/0281921 A1 | 11/2009 | Foster et al. | |
| 2013/0006739 A1 | 1/2013 | Horvitz et al. | |
| 2013/0254085 A1* | 9/2013 | Tanimoto | G06Q 40/04 705/37 |
| 2013/0346237 A1* | 12/2013 | Rademaker | G06Q 10/0836 705/26.8 |
| 2014/0074743 A1* | 3/2014 | Rademaker | G06Q 50/28 705/334 |
| 2014/0095350 A1 | 4/2014 | Carr et al. | |
| 2014/0164126 A1 | 6/2014 | Nicholas et al. | |
| 2014/0279294 A1 | 9/2014 | Field-Darragh et al. | |
| 2015/0161667 A1 | 6/2015 | Stevens et al. | |
| 2015/0206093 A1 | 7/2015 | Trew et al. | |
| 2015/0242918 A1 | 8/2015 | McCarthy | |
| 2015/0379434 A1* | 12/2015 | Argue | G06Q 10/02 705/5 |
| 2016/0063604 A1 | 3/2016 | Shaffer et al. | |
| 2016/0148300 A1 | 5/2016 | Carr et al. | |
| 2016/0203543 A1 | 7/2016 | Snow | |
| 2016/0247113 A1 | 8/2016 | Rademaker | |
| 2016/0314429 A1 | 10/2016 | Gillen et al. | |
| 2017/0018041 A1* | 1/2017 | Fox | G06Q 10/02 |
| 2017/0069013 A1 | 3/2017 | Castillo | |
| 2017/0262929 A1* | 9/2017 | Degraeve | G06Q 30/0635 |
| 2018/0012151 A1* | 1/2018 | Wang | G06Q 10/0639 |
| 2018/0075404 A1* | 3/2018 | Hendrickson | G06Q 50/04 |
| 2020/0242553 A1* | 7/2020 | Zhang | G06Q 10/08355 |

\* cited by examiner

SYSTEMS AND METHODS FOR IMPLEMENTING INCENTIVE-BASED DEMAND DISTRIBUTION TECHNIQUES USING QUEUE TIME ESTIMATES

TECHNICAL FIELD

This disclosure relates generally to scheduling techniques for pickup orders, and more particularly, to scheduling techniques which utilize queue time estimates and pricing incentives to distribute demand evenly across a plurality of time periods.

BACKGROUND

Many retailers provide websites that permit customers to create an order electronically, by selecting products on an e-commerce website and adding the products to a digital shopping cart. In some cases, the retailers also permit the customers to schedule a date and time for picking up or retrieving the order from a pick-up location (e.g., a store). Various obstacles prevent the retailers from providing adequate service levels to their customers in connection with fulfilling such orders. To fulfill scheduled orders in a timely manner, the retailers account for various constraints which cause a bottleneck in the supply chain (e.g., constraints associated with the time required to package an order, the number and availability of persons able to service orders at the pick-up location during the associated time period, etc.). However, the logistics of fulfilling orders in a timely manner can be difficult and customers often experience lengthy wait times when retrieving the orders from the pick-up location. The wait times are often attributable to large numbers of customers scheduling orders to be picked up within the same time periods, and the fact that the pick-up locations have no way to accurately estimate the expected wait times that customers will experience when visiting the pick-up location to retrieve the orders. As a result, the customers are often dissatisfied and frustrated with the service levels provided by the retailers.

BRIEF DESCRIPTION OF THE DRAWINGS

To facilitate further description of the embodiments, the following drawings are provided in which.

Figure 1:
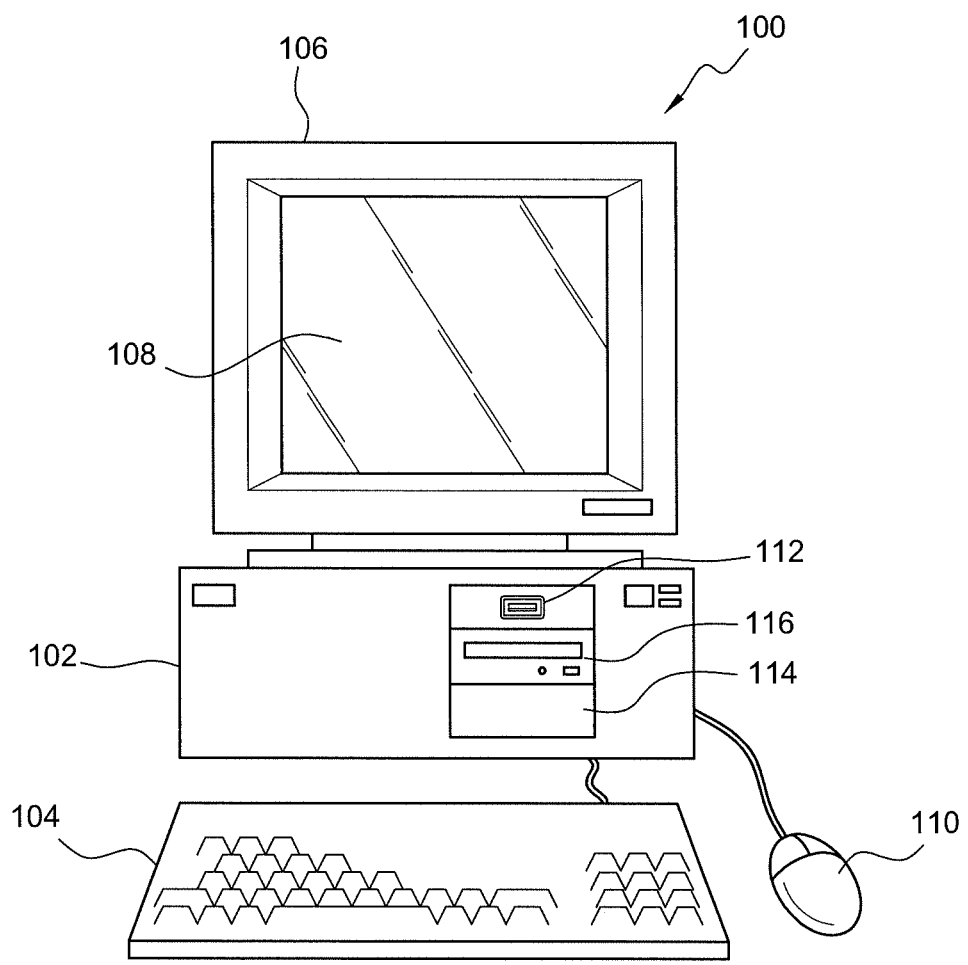
FIG. 1 illustrates a front elevational view of a computer system that is suitable for implementing various embodiments of the system, e.g., such as the embodiment disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform the act of providing an electronic platform that enables customers to view and select pick-up options for scheduling orders to be retrieved at a location, wherein each pick-up option is associated with a price and a queue time for scheduling an order within a time period associated with the pick-up option. The one or more storage modules also can be configured to run on the one or more processing modules and perform an act of determining an average service time indicating an average amount of time associated with processing an order at the location and an average inter-arrival time indicating an average arrival rate of customers at the location. The one or more storage modules also can be configured to run on the one or more processing modules and perform an act of executing, in response to a customer accessing the electronic platform, a queuing procedure that calculates queue times and prices for each of the pick-up options based, at least in part, on the average service time and the average inter-arrival time. The one or more storage modules also can be configured to run on the one or more processing modules and perform an act of applying the queuing procedure to dynamically update the calculated queue times and prices for the pick-up options in real-time in response to the customers scheduling orders. The one or more storage modules also can be configured to run on the one or more processing modules and perform an act of generating instructions for providing an interface that displays at least a portion of the pick-up options with the updated queue times and prices.

Various embodiments include a method. The method can include providing, with one or more processing modules, an electronic platform that enables customers to view and select pick-up options for scheduling orders to be retrieved at a location, wherein each pick-up option is associated with a price and a queue time for scheduling an order within a time period associated with the pick-up option. The method also can include determining an average service time indicating an average amount of time associated with processing an order at the location and an average inter-arrival time indicating an average arrival rate of customers at the location. The method also can include executing, in response to a customer accessing the electronic platform, a queuing procedure that calculates queue times and prices for each of the pick-up options based, at least in part, on the average service time and the average inter-arrival time. The method also can include applying the queuing procedure to dynamically update the calculated queue times and prices for the pick-up options in real-time in response to the customers scheduling orders. The method also can include generating, with the one or more processing modules, instructions for providing an interface that displays at least a portion of the pick-up options with the updated queue times and prices.

Figure 2:
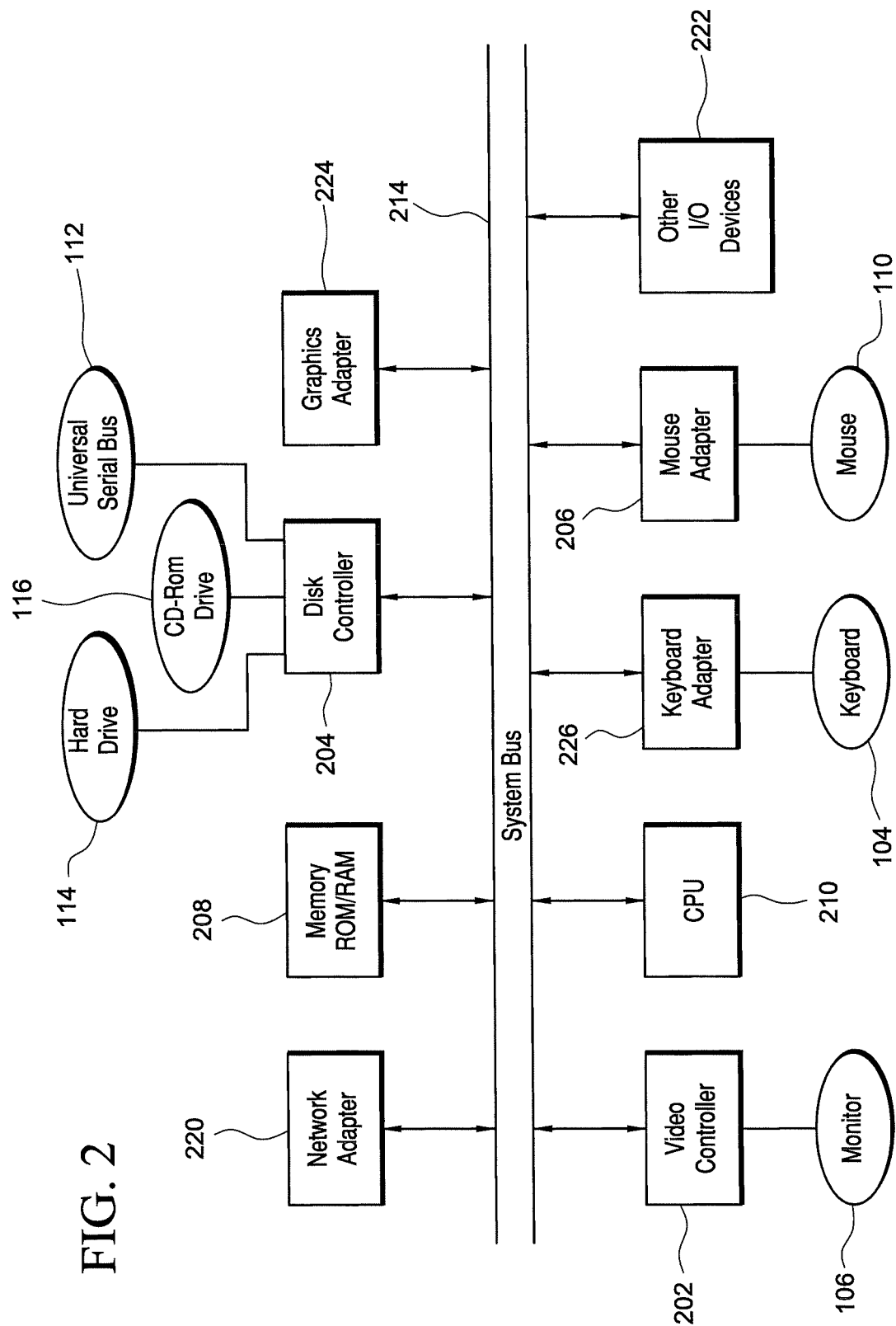
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
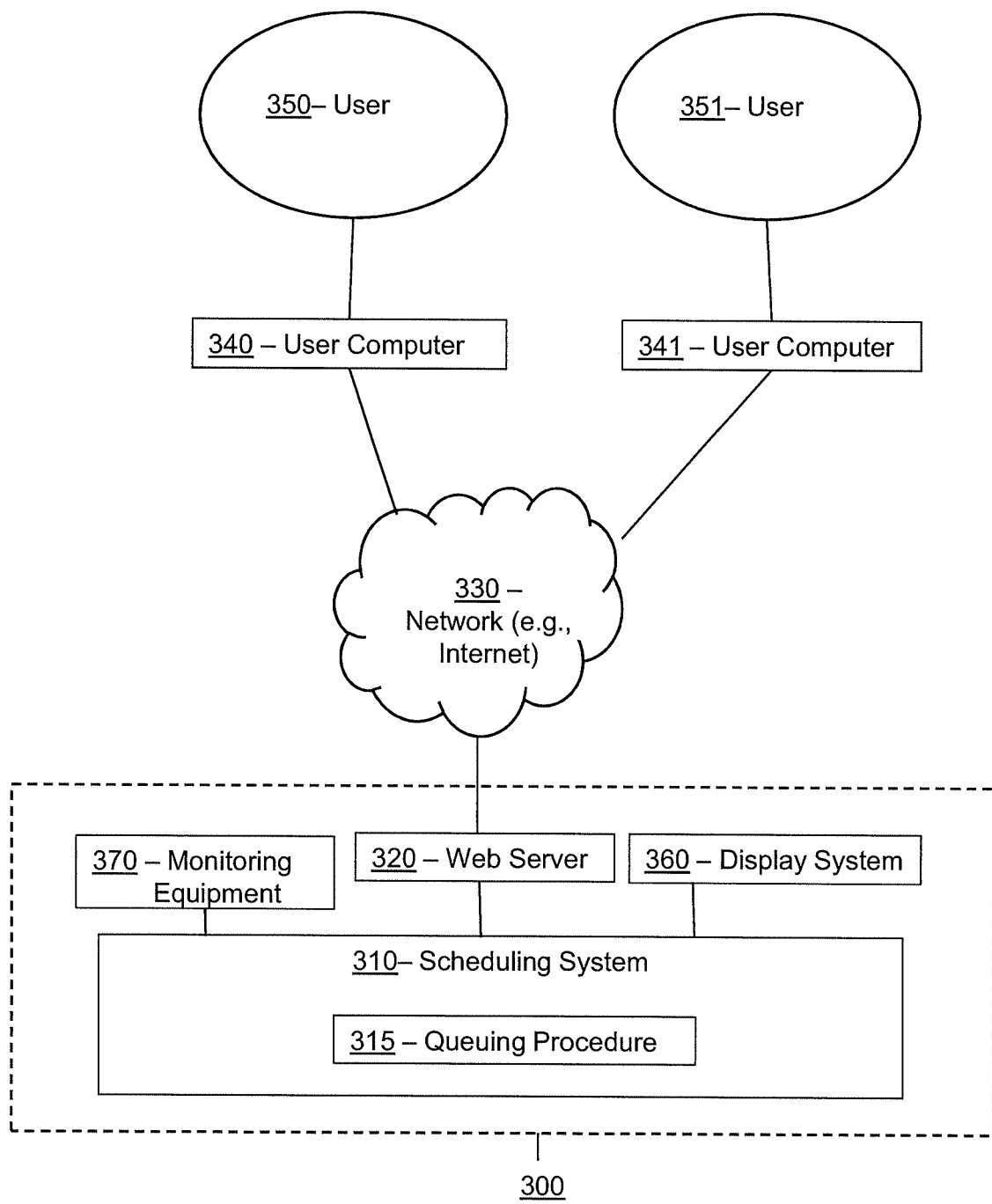
FIG. 3 illustrates a representative block diagram of a system according to certain embodiments.

Turning ahead in the drawings, FIG. 3 illustrates a block diagram of a system 300 that can be employed for scheduling pick-up requests using queuing techniques which assist with evenly distributing demand and fulfillment operations across a plurality of time periods. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a scheduling system 310, a queuing procedure 315, a web server 320, a display system 360, and/or monitoring equipment 370. In some embodiments, queuing procedure 315 can be referred to as a queuing algorithm, and scheduling system 310 can be referred to as a scheduling platform. In the same or different embodiments, queuing procedure 315 can be part of scheduling system 310.

Scheduling system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of scheduling system 310, queuing procedure 315, web server 320, and display system 360. Additional details regarding scheduling system 310, web server 320, and display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through a network 330 with user computers (e.g., 340, 341). The network may be any type of network such as one that includes the Internet, a local area network, a wide area network, an intranet, an extranet, and/or other network. In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, to purchase products, and/or to schedule products or orders for pick-up and delivery, in addition to other suitable activities.

In many embodiments, the scheduling system 310, queuing procedure 315, web server 320, display system 360 and monitoring equipment 370 can each comprise, or be connected to, one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of scheduling system 310, queuing procedure 315, web server 320, and display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of scheduling system 310, web server 320, and display system 360. In a similar manner, the processing module(s) and the memory storage module(s) can be local and/or remote to each other.

In many embodiments, scheduling system 310, queuing procedure 315, web server 320, display system 360 and/or and monitoring equipment 370 can be configured to communicate with one or more user computers 340 and 341. In some embodiments, scheduling system 310, queuing procedure 315, web server 320 and/or display system 360 can communicate or interface (e.g., interact) with one or more customer computers (such as user computers 340 and 341) through a network 330 (e.g., the Internet). Network 330 can be an intranet that is not open to the public. Accordingly, in many embodiments, scheduling system 310, web server 320 and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in certain embodiments, scheduling system 310, queuing procedure 315, web server 320, display system 360 and/or and monitoring equipment 370 also can be configured to communicate with one or more databases. The one or more databases can comprise a product database that includes information about products, items, or SKUs (stock keeping units) sold by a retailer. The one or more databases also can comprise a scheduling database that includes information about pick-up orders and deliveries that have been scheduled by users 350, 351. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between scheduling system 310, queuing procedure 315, web server 320, display system 360, monitoring equipment 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Retailers involved with fulfilling orders face many logistical constraints and obstacles in terms of packaging the orders for individuals and providing the orders for pick up or retrieval. These constraints and obstacles cause customers to experience extended wait times at the pick-up locations when retrieving the orders. The wait times are due, at least in part, to the fact that the many orders are often scheduled to be retrieved within particular time periods, thus overwhelming the retailers during these time periods because they do not have adequate resources and/or personnel to fulfill the orders in a timely manner.

The scheduling system 310 can perform various functions that assist customers (e.g., users 350, 351) with scheduling orders for pick-up and that assist the retailers with servicing the orders in a timely manner. In certain embodiments, a customer may initially access an electronic platform made available via the system 300 and/or web server 320 in order to browse and select products (e.g., by adding the products to a shopping cart). After the customer is done browsing the website, the scheduling system 310 enables the customer to schedule the selected products to be retrieved by the customer at a specific pick-up location. Exemplary pick-up locations may include retail store locations, pick-up lockers, warehouses, order fulfillment centers or any other location.

To assist the customer with scheduling a pick-up order, the scheduling system 310 may generate one or more interfaces that can be displayed on the customer's user computer 340, 341 to provide a listing of available pick-up dates and times. Some or all of the pick-up options may include a queue time indicator that specifies an estimated amount of time the customer will likely wait in line at the pick-up location when the customer is picking up the package. Some or all of the pick-up options also may include a pricing indicator that specifies a price for reserving or scheduling a pick-up order within the time periods associated with the pick-up options.

The scheduling system 310 includes, inter alia, a queuing procedure 320 which executes an algorithm that provides assistance with evenly distributing demand and fulfillment operations across a plurality of time periods. The queuing procedure 315 is configured to calculate expected wait times (also referred to "queue times") associated with each of the pick-up options and to assign prices (or other incentives such as discounts, rebates or reward card incentives) to different pick-up options based on demand. The queuing procedure 315 can use various parameters and factors to accurately calculate the expected wait times for customers. For example, the queuing procedure 315 can calculate the wait time or queue time for a pick-up option based on the number of customers expected to require service during the time period associated with the option, the steps involved in fulfilling particular orders, the time required to package an order, the time required to service a customer, the availability of batching the order with other orders, the number and availability of persons able to service orders at the pick-up location during the associated time period, etc. Generally speaking, the queuing procedure 315 can take any supply chain bottleneck or constraint into account in calculating the wait times.

In certain embodiments, the queuing procedure 315 initially determines whether or not a customer should be placed in a queue. The queuing procedure 315 may initially analyze the available personnel (e.g., available personnel to service customer orders) at a pick-up location. This personnel availability analysis can be done in real-time or based on an employee schedule that reflects how many persons are able to service orders during any particular time period. If at least one person at the location is determined to be idle (e.g., not servicing a customer), the queuing procedure 315 determines that an arriving customer is able to be served immediately and spends no time in queue (thus, no expected queue time). But if the queuing procedure 315 determines that all persons at the location are likely to be busy at a particular time, the arriving customer joins the end of a queue from which customers are served in first-come-first-served order. The customer arrival process is a Poisson process, meaning that times between successive arrivals are independent and the time required to service each of the customers is independent of the arrival times. Along these lines, the queue times calculated by the queuing procedure 315 can be viewed as the amount of time a customer enters the pick-up queue until the time the customer is served by the customer. The queue time is directly proportional to the below three components: service time (e.g., amount of time required to service a customer), inter-arrival time of customers (e.g., time between customer arrivals) and slot size (e.g., maximum number of customers that are able to request orders within the time period). Each of these components is discussed in further detail below.

In certain embodiments, the queuing procedure 315 calculates the wait times using a formula that is based, at least in part, on an average service time value and an average inter-arrival time value. The average service time value reflects the average amount of time spent on servicing a single customer or single pick-up order at the pick-up location. For example, this value may reflect the average time it takes an associate or employee at the pick-up location to process an order (e.g., which may include, inter alia, the time spent on retrieving a prepared order from shelving or storage, handing the prepared order to the customer and/or processing payment for the order). The average inter-arrival time value reflects the average amount of time between each customer's arrival within a period of time (e.g., an hour) or the arrival rate of customers. For example, if ten customers are arriving every hour, then the average inter-arrival time value may be equal to six minutes.

In certain embodiments, the queuing procedure 315 executes the following formula or algorithm to calculate a wait time for each of the pick-up options:

$$\text{Queue Time} = \text{Average Service Time} * \left(\frac{\text{Utilization}}{1 - \text{Utilization}}\right) * (Cva^2 + CVp^2)/2$$

where,
utilization=average service time/average inter-arrival time;
average service time=the average time it takes to service a customer;
average inter-arrival time=the average time between each customer's arrival per hour (or other time period) or the arrival rate of customers;
$CVa^2$=coefficient of variation of inter-arrival times; and
$CVp^2$=coefficient of variation of service times.

To illustrate by way of example, consider a scenario in which an average of ten customers arrive at a pick-up location per hour, and it takes an employee at the pick-up counter an average of four minutes to service a customer. In this scenario, the average inter-arrival time would be 6 minutes (i.e., 10 customers/60 minutes), and the average service time would be 4 minutes. Plugging these variables into the above equation would result in a queue time estimate of 8 minutes. All of the calculated queue times can then be displayed along with pick-up options that are presented to users 350, 351 on interfaces displayed by the scheduling system 310.

The manner in which the variables (e.g., average service time and average inter-arrival time) utilized by the queuing procedure 315 are determined can vary. In certain embodiments, these variables can be pre-stored or pre-determined data values which are input by an administrator or other individual associated with the system 300. In certain embodiments, these variables can be based on a real-time analysis of operations at a pick-up location or a plurality of pick-up locations using monitoring equipment 370. Real-time operations associated with fulfilling orders at the pick-up location can be analyzed in various ways. For example, to assist with calculating service time, the monitoring equipment 370 may include a computer(s) that permits an associate or employee to provide inputs into a computer system indicating a beginning time and an ending time of a service period associated with each customer that is serviced. These inputs can be utilized to calculate an average service time across a plurality of customers. As another example, the pick-up locations can be outfitted with other types of monitoring equipment 370 including, but not limited to, cameras (e.g., which include audio/video sensors) and/or other types of sensors (e.g., proximity sensors, load sensors, etc.). The cameras and sensors may be connected to, or in communication with, analysis software and/or circuitry that analyzes inputs from the cameras and sensors to monitor operations at a pick-up location and to calculate the average service time, the average inter-arrival time and any other variables that many be utilized by the queuing procedure 315 to compute wait times. The variables utilized by the queuing procedure 315 to calculate wait times can be determined in other ways as well.

The manner in which the queuing procedure 315 can adjust prices displayed with the pick-up options also can vary. In certain embodiments, the queuing procedure 315 calculates the price of a pick-up option based, at least in part, on the number of people that have scheduled pick-ups with the time period associated with the pick-up option, the current queue time calculated for the pick-up option, and one or more weighting value. For example, in certain embodiments, the queuing procedure 315 can compute a price for a pick-up option using the following a formula or algorithm:

Price=(NumOfPeople*Queue Time*WeightMul)+WeightCon where,
NumOfPeople=the number of customers who have already scheduled a pick-up order in time period associated with the pick-up option;
Queue Time=the estimate time that a customer will wait at a pick-up location when picking up an order;
WeightMul=a weighting value multipler that may be associated with a particular queue time; and
WeightCon=a weighting value constant that may be associated with a particular queue time.

The table below illustrates exemplary scenarios for calculating prices in three different time periods:

| Price | NumOfPeople | Queue Time | WeightMul | WeightCon |
|-------|-------------|------------|-----------|-----------|
| $4.20 | 1 | 10 | .02 | 4 |
| $4.40 | 2 | 10 | .02 | 4 |
| $6.32 | 6 | 12 | .06 | 2 |

As shown above, if it is determined that the queue time for a pick-up option is 10 minutes and only 1 customer previously reserved the pick-up option, the pre-determined values for WeightMul and WeightCon associated with the queue time can be retrieved (e.g., from a table with associated weight values with wait times), and the variables can be plugged into the above equation to compute price of $4.20 for the pick-up option. Likewise, if it is determined that the queue time for a pick-up option is 10 minutes and 2 customers previously reserved the pick-up option, the pre-determined values for WeightMul and WeightCon associated with the queue time can be retrieved, and the variables can be plugged into the above equation to compute price of $4.40 for the pick-up option. Again, if it is determined that the queue time for a pick-up option is 12 minutes and 6 customers previously reserved the pick-up option, the pre-determined values for WeightMul and WeightCon associated with the queue time can be retrieved, and the variables can be plugged into the above equation to compute price of $6.32 for the pick-up option. All of the calculated prices can then be displayed along with pick-up options that are presented to users 350, 351 on interfaces displayed by the scheduling system 310.

Figure 4:
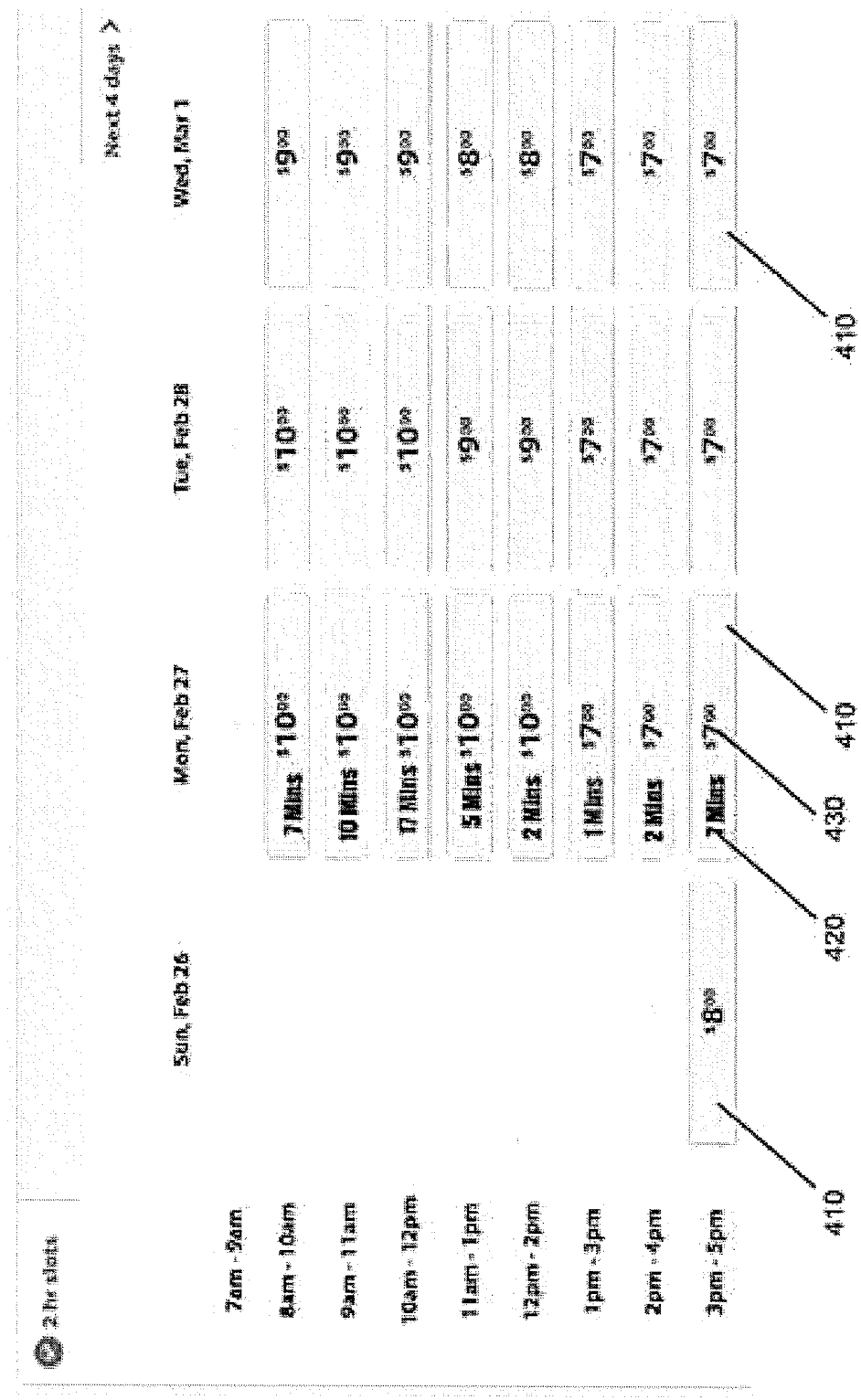
FIG. 4 is an illustration of an exemplary user interface, according to certain embodiments.

FIG. 4 illustrates an exemplary graphical user interface 400 that may be generated by the scheduling system 310 (FIG. 3) and/or queuing procedure 315 (FIG. 3) to assist users 350, 351 (FIG. 3) with scheduling orders for pick-up. The interface 400 includes a table that includes a plurality of pick-up options 410, with each column of the table corresponding to a specific day and each row of the table corresponding to a specific time period within a day. A user can select a pick-up option associated with a specific date and time to indicate a desired time period for picking up an order at a pick-up location. Pick-up options 410 may not be displayed in the table if the associated time period has already passed and/or if the maximum number of orders permitted for the time period (or maximum slot size) has already been met or exceeded.

Each of the displayed pick-up options 410 includes a pricing indicator 430 that that identifies how much the user will pay if the user wants to reserve or schedule a pick-up order within the associated timeframe. Some of the displayed pick-up options 410 also include a queue time indicator 420 that indicates the amount of time the customer will likely be required to wait at the pick-up location when retrieving a pick-up order. The pricing indicator 430 and queue time indicator 420 can be calculated by the queuing procedure 315 (FIG. 3). In certain embodiments, the queue time indicators 420 are only displayed with the pick-up options if there is expected to be a wait time at the pick-up location during the associated time period, and the queue time indicators are not displayed if there is not expected to be a wait time during an associated time period. In certain embodiments, the scheduling system 310 (FIG. 3) may increase prices associated with a pick-up option as more users 350, 351 (FIG. 3) select or reserve that option and, conversely, may decrease prices associated with a pick-up option if the number of persons selecting or reserving the option decrease (e.g., in the case users cancel or re-schedule a pick-up order). In doing so, the scheduling system 310 assists with distributing demand evenly across the pick-up options 410 (FIG. 3) by providing monetary incentives to the users 350, 351 (FIG. 3) for scheduling pick-up orders in time periods when the pick-up location is less busy and has the capacity to fulfill additional orders. This demand distribution allows the pick-up location to decrease overall wait times and provide better service to customers.

In certain embodiments, a pick-up option 410 is still displayed even if the maximum slot size has been exceeded. However, the price computed for such a pick-up option 410 is significantly increased relative prices that are calculated for pick-up option 410 in which the maximum slot size has not been exceeded. For example, a price assigned to a pick-up option 410 that has already exceed its maximum slot size may be weighted to increase the its price to be 5×, 10×, 25×, 50× or 100× more a standard price that is calculated for a pick-up option 410.

Figure 5:
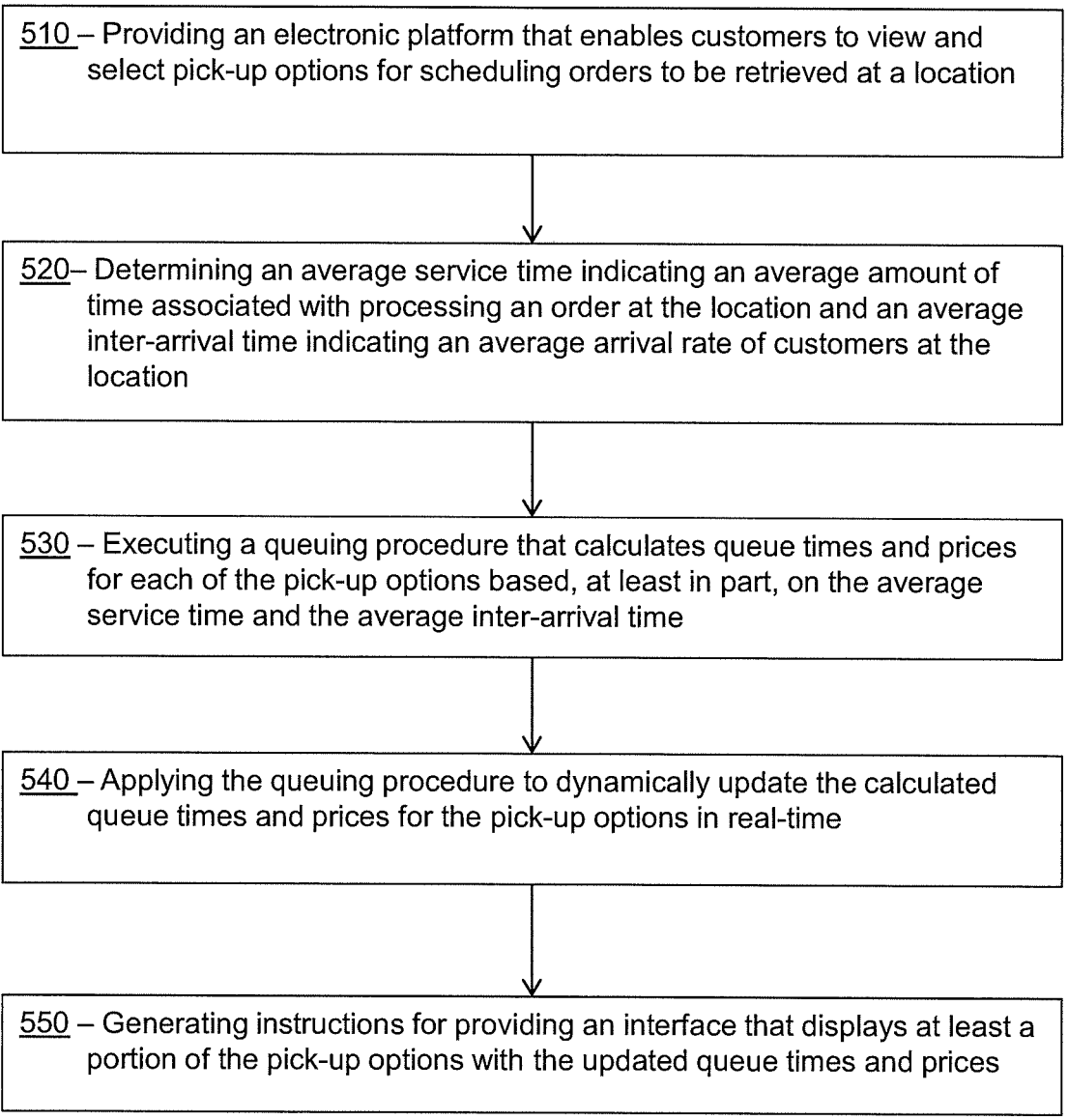
FIG. 5 is a flowchart for a method, according to additional embodiments.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules. Such non-transitory memory storage modules can be part of a computer system such as system 300 (FIG. 3), scheduling system 310 (FIG. 3) and/or display system 360 (FIG. 3). The processing module(s) can be similar or identical to the processing module(s) described above with respect to computer system 100 (FIG. 1).

Method 500 can comprise an activity 510 of providing an electronic platform that enables customers to view and select pick-up options for scheduling orders to be retrieved at a location. The pick-up options in activity 510 can be similar to pick-up option 410 (FIG. 4), and the electronic platform may be provided by system 300 (FIG. 3) and may be accessed by user computers 340, 341 (FIG. 3) via a web browser and/or application (e.g., mobile application or desktop application). For example, a user 350, 351 (FIG. 3) may access a website that enables the user 350, 351 (FIG. 3) to browse a selection of items, products or services and to select the items, products or services in connection with an order. After the user 350, 351 (FIG. 3) has finalized the order, the user 350, 351 (FIG. 3) can view a plurality of pick-up options for scheduling orders to be retrieved at a pick-up location (e.g., retail location or pick-up locker). Each pick-up option may correspond to a particular date and time.

The method 500 may further comprise an activity 520 of determining an average service time indicating an average amount of time associated with processing an order at the location and an average inter-arrival time indicating an average arrival rate of customers at the location. In certain embodiments, determining the average service time and/or the average amount of time may involve retrieving predetermined values stored in databases associated with the system 300. In certain embodiments, the average service time and/or the average amount of time also can be determined in real-time based on operations at a pick-up location. For example, the location may include monitoring equipment 370 (e.g., cameras, computers, and/or sensors) and related software that can detect service times associated with fulfilling orders and inter-arrival times of customers.

The method 500 may further comprise an activity 530 of executing a queuing procedure that calculates queue times and prices for each of the pick-up options based, at least in part, on the average service time and the average inter-arrival time. The queuing procedure in activity 530 can be similar to queuing procedure 315 (FIG. 3), and the pick-up options in activity 530 can be similar to pick-up option 410 (FIG. 4). In certain embodiments, the queuing procedure computes the queue times (or "wait times") and prices using the formulas described above. The queuing procedure calculates the queue times and prices in manner which assists with distributing demand evenly (or somewhat evenly) across the pick-up options 140. Generally speaking, the queuing procedure 315 (FIG. 3) may analyze the queue times and the number of scheduled pick-ups for the pick-up options 410 (FIG. 4), and calculate prices for the pick-up options to incentive users 350, 351 (FIG. 3) to select the pick-up options 410 (FIG. 4) having a lower number of scheduled orders and/or decreased wait times. Because the pick-up options 410 (FIG. 4) having longer queue times and/or larger number of scheduled orders will be assigned higher prices, the users 350, 351 (FIG. 3) will be incentivized to select the lower priced pick-up options 410 (FIG. 4) associated with time periods when there are fewer orders to handle and/or decreased queue times. This technique serves to distribute the demand more evenly across the pick-up options 410 (FIG. 3).

The method 500 may further comprise an activity 540 of applying the queuing procedure to dynamically update the calculated queue times and prices for the pick-up options in real-time. As more orders are scheduled for pick-up, the queuing procedure will dynamically and continuously update the queue times and prices associated with each of the available pick-up options.

The method 500 may further comprise an activity 550 of generating instructions for providing an interface that displays at least a portion of the pick-up options 410 (FIG. 4) with the updated queue times and prices. The interfaces may then be presented to the users 350, 351 (FIG. 3) by the electronic platform with the updated queue times and prices. The users 350, 351 (FIG. 3) can view the queue times and prices in real-time to make informed decisions regarding the selection of pick-up options.

Figure 6:
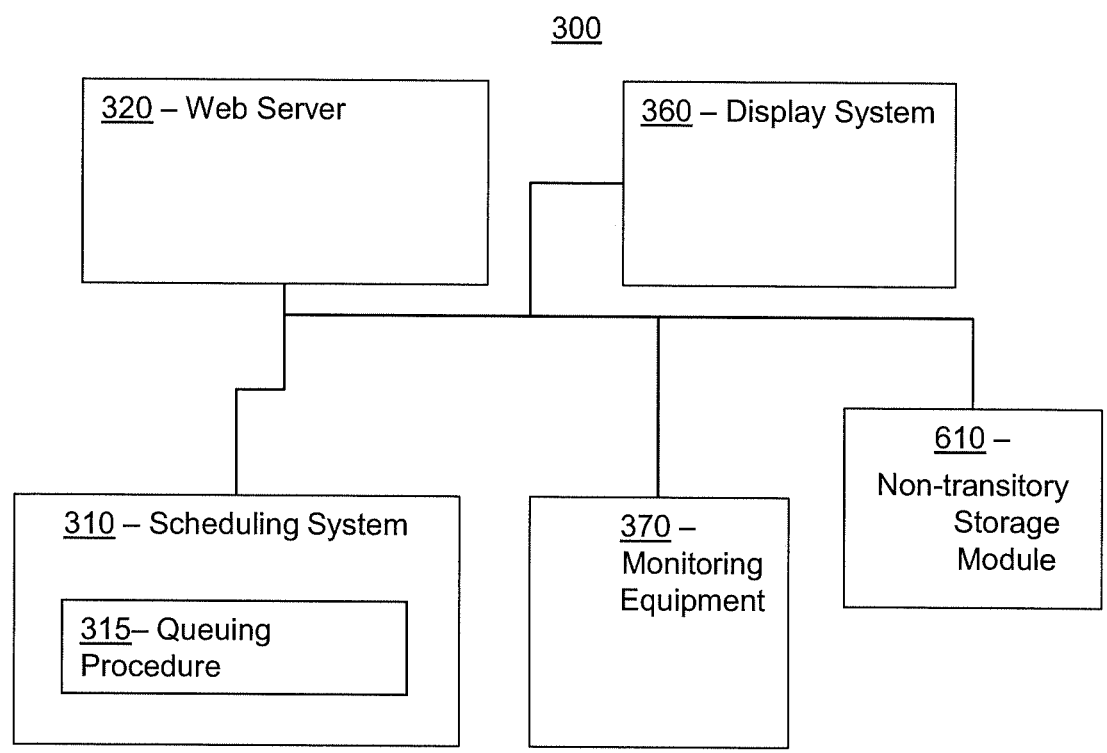
FIG. 6 illustrates a representative block diagram of a portion of the system of FIG. 3, according to an embodiment.

FIG. 6 illustrates a block diagram of a portion of system 300 comprising scheduling system 310 (including queuing procedure 315), web server 320, display system 360, and monitoring equipment 370, according to the embodiment shown in FIG. 3. The block diagram of FIG. 6 also shows non-transitory storage module 610 as part of the portion of system 300. Each of scheduling system 310, web server 320, display system 360, monitoring equipment 370 and non-transitory storage module 610 is merely exemplary and not limited to the embodiments presented herein. Each of scheduling system 310, web server 320, display system 360, monitoring equipment 370 and non-transitory storage module 610 can be employed in many different embodiments or examples not specifically depicted or described herein. In some embodiments, certain elements or modules of scheduling system 310, web server 320, display system 360, monitoring equipment 370 and non-transitory storage module 610 can perform various procedures, processes, and/or acts. In other embodiments, the procedures, processes, and/or acts can be performed by other suitable elements or modules.

In many embodiments, each of the scheduling system 310, web server 320, display system 360 and monitoring equipment 370 can be in communication with or comprise one or more non-transitory memory storage modules 610. In many embodiments, memory storage modules 610 can store computing instructions configured to run on one or more processing modules and perform one or more acts of method 500 (e.g., activities 510, 520, 530, 540, and 550 of FIG. 5).

Although systems and methods for scheduling pick-up orders have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
      providing an electronic scheduling platform that enables customers to view and select pick-up options for scheduling orders to be retrieved at a location, each pick-up option being associated with a respective price and a respective queue time for scheduling a respective order of the orders within a respective time period associated with the pick-up option;
      determining an average service time indicating an average amount of time associated with processing an order at the location and an average inter-arrival time indicating an average arrival rate of the customers at the location, wherein the average service time and the average inter-arrival time are determined by (a) monitoring operations associated with service times and inter-arrival times at the location and (b) dynamically updating the average service time and the average inter-arrival time;
      in response to a customer of the customers accessing the electronic scheduling platform, executing a queuing procedure that is used to calculate queue times and that is used to determine prices for the pick-up options based, at least in part, by the average service time, utilization that represents the average service time and the average inter-arrival time, and a sum of a coefficient of variation of inter-arrival times and a coefficient of variation of service times;
      in response to the customers scheduling the orders, applying the queuing procedure to dynamically update the queue times and the prices that are calculated for the pick-up options; and
      generating instructions for providing an interface that displays at least a portion of the pick-up options with the queue times and the prices that are updated.

2. The system of claim 1, wherein the queuing procedure is further used to dynamically update the queue times and the prices that are calculated for the pick-up options such that the prices associated with the pick-up options increase as the queue times associated with the pick-up options increase.

3. The system of claim 1, wherein the queuing procedure is used to further calculate the queue times using a formula:

$$\text{Queue Time} = \text{Average Service Time} * \left(\frac{\text{Utilization}}{1 - \text{Utilization}}\right) * (Cva^2 + CVp^2)/2$$

where,
utilization represents the average service time/the average inter-arrival time;
the average service time represents an average amount of time it takes to service the customers at the location;
the average inter-arrival time represents an average amount of time between a respective arrival of each of the customers at the location;
$CVa^2$ represents the coefficient of variation of inter-arrival times; and
$CVp^2$ represents the coefficient of variation of service times.

4. The system of claim 1, wherein the queuing procedure is further used to calculate the respective price for a pick-up option based, at least in part, on (i) a number of customers that have previously scheduled orders for the pick-up option and (ii) the respective queue time calculated for the pick-up option.

5. The system of claim 1, wherein the computing instructions are further configured to run on the one or more processors and perform:
   for each of the pick-up options, determining a maximum slot size indicating a maximum number of customers that are able to request respective orders within the respective time period associated with the pick-up option; and
   utilizing the maximum slot size to place limits on how many of the respective orders can be scheduled within each of the pick-up options.

6. The system of claim 1, wherein the average service time and the average inter-arrival time are further determined by analyzing input data from monitoring equipment comprising a camera and a sensor located at the location.

7. The system of claim 1, wherein the average service time and the average inter-arrival time are further determined by retrieving pre-determined values which are stored on the one or more non-transitory computer-readable media.

8. The system of claim 1, wherein the queuing procedure is used to further calculate the prices using a formula:

$$\text{Price} = (\text{NumOfPeople} * \text{Queue Time} * \text{WeightMul}) + \text{WeightCon}$$

where,
NumOfPeople represents a number of customers who have previously scheduled orders in a time period associated with a particular pick-up option;
Queue Time represents an estimated queue time that the customers will wait at the location when picking up the orders;
WeightMul represents a weighting value multiplier that is associated with a particular queue time; and
WeightCon represents a weighting value constant that is associated with the particular queue time.

9. The system of claim 1, wherein the electronic scheduling platform communicates with a plurality of user computers operated by the customers over a network that includes one or more of:

an Internet, a local area network, a wide area network, an intranet, or an extranet.

10. The system of claim 1, wherein the location is selected from a group consisting of:
a retail location and a pick-up locker.

11. A method comprising:
providing, with one or more processors, an electronic scheduling platform that enables customers to view and select pick-up options for scheduling orders to be retrieved at a location, each pick-up option being associated with a respective price and a respective queue time for scheduling a respective order of the orders within a respective time period associated with the pick-up option;
determining an average service time indicating an average amount of time associated with processing an order at the location and an average inter-arrival time indicating an average arrival rate of the customers at the location, wherein the average service time and the average inter-arrival time are determined by (a) monitoring operations associated with service times and inter-arrival times at the location and (b) dynamically updating the average service time and the average inter-arrival time;
in response to a customer of the customers accessing the electronic scheduling platform, executing, with the one or more processors, a queuing procedure that is used to calculate queue times and that is used to determine prices for the pick-up options based, at least in part, by the average service time, utilization that represents the average service time and the average inter-arrival time, and a sum of a coefficient of variation of inter-arrival times and a coefficient of variation of service times;
in response to the customers scheduling the orders, applying the queuing procedure to dynamically update the queue times and the prices that are calculated for the pick-up options; and
generating, with the one or more processors, instructions for providing an interface that displays at least a portion of the pick-up options with the queue times and the prices that are updated.

12. The method of claim 11, wherein the queuing procedure is further used to dynamically update the queue times and the prices that are calculated for the pick-up options such that the prices associated with the pick-up options increase as the queue times associated with the pick-up options increase.

13. The method of claim 11, wherein the queuing procedure is further used to calculate the queue times using a formula:

$$\text{Queue Time} = \text{Average Service Time} * \left(\frac{\text{Utilization}}{1 - \text{Utilization}}\right) * (CVa^2 + CVp^2)/2$$

where,
utilization represents the average service time/the average inter-arrival time;

the average service time represents an average amount of time it takes to service the customers at the location;
the average inter-arrival time represents an average amount of time between a respective arrival of each of the customers at the location;
$CVa^2$ represents the coefficient of variation of inter-arrival times; and
$CVp^2$ represents the coefficient of variation of service times.

14. The method of claim 11, wherein the queuing procedure is further used to calculate the respective price for a pick-up option based, at least in part, on (i) a number of customers that have previously scheduled orders for the pick-up option and (ii) the respective queue time calculated for the pick-up option.

15. The method of claim 11, wherein the method further comprises:
for each of the pick-up options, determining a maximum slot size indicating a maximum number of customers that are able to request respective orders within the respective time period associated with the pick-up option; and
utilizing the maximum slot size to place limits on how many of the respective orders can be scheduled within each of the pick-up options.

16. The method of claim 11, wherein the average service time and the average inter-arrival time are further determined by analyzing input data from monitoring equipment comprising a camera and a sensor located at the location.

17. The method of claim 11, wherein the average service time and the average inter-arrival time are further determined by retrieving pre-determined values which are stored on one or more non-transitory computer-readable media.

18. The method of claim 11, wherein the queuing procedure is further used to calculate the prices using a formula:

Price=(NumOfPeople*Queue Time*WeightMul)+ WeightCon where,
NumOfPeople represents a number of customers who have previously scheduled orders in a time period associated with a particular pick-up option;
Queue Time represents an estimated queue time that the customers will wait at the location when picking up the orders;
WeightMul represents a weighting value multiplier that is associated with a particular queue time; and
WeightCon represents a weighting value constant that is associated with the particular queue time.

19. The method of claim 11, wherein the electronic scheduling platform communicates with a plurality of user computers operated by the customers over a network that includes one or more of:
an Internet, a local area network, a wide area network, an intranet, or an extranet.

20. The method of claim 11, wherein the location is selected from a group consisting of:
a retail location and a pick-up locker.

* * * * *